United States Patent [19]

Owen, Jr.

[11] 4,294,941

[45] Oct. 13, 1981

[54] COMPATIBLE LOW SHRINK RESIN SYSTEMS

[75] Inventor: Gwilym E. Owen, Jr., Granville, Ohio

[73] Assignee: Owens-Corning Fiberglas Corporation, Toledo, Ohio

[21] Appl. No.: 103,751

[22] Filed: Dec. 14, 1979

[51] Int. Cl.$^3$ .............................................. C08L 67/06
[52] U.S. Cl. ...................................... 525/170; 525/49
[58] Field of Search .......................................... 525/170

[56] References Cited

U.S. PATENT DOCUMENTS

| | | | |
|---|---|---|---|
| 2,819,248 | 1/1958 | Casebolt | 525/170 |
| 3,129,110 | 4/1964 | Anderson | 525/170 |
| 3,772,241 | 11/1973 | Kroekel | 525/170 |
| 3,804,799 | 4/1974 | Uffner | 525/170 |
| 3,883,612 | 5/1975 | Pratt | 525/170 |
| 4,035,439 | 7/1977 | Stevenson | 525/44 |
| 4,048,257 | 9/1977 | Stevenson | 525/170 |
| 4,201,826 | 5/1980 | Hylander | 525/170 |
| 4,218,546 | 8/1980 | Downing | 525/170 |

FOREIGN PATENT DOCUMENTS

| | | | |
|---|---|---|---|
| 887693 | 12/1971 | Canada | 525/170 |
| 42-9269 | 5/1967 | Japan | 525/170 |
| 48-21784 | 3/1973 | Japan | 525/170 |

*Primary Examiner*—Paul Lieberman
*Attorney, Agent, or Firm*—Ronald C. Hudgens; Philip R. Cloutier

[57] ABSTRACT

Moldable systems comprising a thermoplastic resin and a thermosetting resin, the thermosetting resin comprising an unsaturated polyester. The resin systems are one-phase and do not show a tendency towards macroscopic phase separation for a period of least four weeks.

8 Claims, No Drawings

COMPATIBLE LOW SHRINK RESIN SYSTEMS

BACKGROUND OF THE INVENTION

This invention pertains to compatible low shrink resin systems.

In one of its more specific aspects, this invention pertains to low profile, low shrink resin systems employable in the production of fiber-reinforced molded parts, the resin system being a homogenous, one-part system comprising a thermoplastic resin and a thermosetting resin.

The use of resin systems which comprise a combination of thermoplastic and thermosetting polymers, the combination producing low sink and low shrink molded parts, is well known. Generally, such systems comprise a thermosetting resin, that is, an unsaturated polyester, a thermoplastic resin and a monomer which cross-links with the polyester. Such systems usually contain other ingredients such as catalysts, glass fibers, fillers, pigments, mold-release agents and the like.

These systems form the basis for sheet and bulk molding compounds which, when molded, form comparatively light-weight durable articles of superior surface characteristics.

Such resin systems are described and claimed in U.S. Pat. No. 3,772,241 to C. H. Kroekel. However, the resin systems described therein exist, prior to incorporation into molding compounds, as two-part systems; that is, they are systems in which the thermoplastic resin and the polyester-monomer combination are incompatible and after being mixed, separate on standing to form two phases.

The disadvantages of such systems include the need for individual storage systems for each resin, the need to mix only at the time of use and the need to use soon after mixing and prior to the separation.

While one-phase polyester-thermoplastic resins do exist as described, for example, in U.S. Pat. Nos. 4,035,439 and 3,883,612, the systems are limited to rather specific components as the elements of the combination resin system.

There has now been discovered a resin system embodying a wider range of components which system is not subject to phase separation under prolonged periods of standing.

STATEMENT OF THE INVENTION

This invention provides a moldable composition and the product related thereto comprising a thermoplastic and a thermosetting resin, said thermosetting resin comprising an unsaturated polyester produced by the interreaction of propylene glycol, dipropylene glycol, maleic anhydride and adipic acid, the sum of the weight of said dipropylene glycol and said adipic acid comprising not less than about 30 percent of the weight of the theoretical yield of the polyester product.

In its preferred embodiment, the thermoplastic resin will comprise the terpolymer of vinyl-acetate, methylmethacrylate and acrylic acid.

In another of its embodiments, the unsaturated polyester is produced by the interreaction of diethylene glycol.

The expected yield of the polyester is the total weight of the interreactants employed in forming the polyester minus the theoretical weight of the water formed during interreaction, it being assumed that complete reaction of the limiting reagent, usually the acid, takes place. The total weight excludes all components not theoretically entering into the reaction.

DESCRIPTION OF THE INVENTION

The thermoplastic resin system employable in this invention can be any thermoplastic employed in the prior art for the production of thermoplastic-thermosetting resin systems suitable for molding to produce molded objects exhibiting low sink and low shrink.

In its preferred embodiment, the thermoplastic resin will comprise the terpolymer of vinyl-acetate, methylmethacrylate and acrylic acid.

In its most preferred embodiment, the thermoplastic will be comprised of the reaction product of about 71.4 parts by weight of vinyl-acetate, 27.4 parts of methylmethacrylate monomer and about 1.2 parts of acrylic acid and will be prepared as set forth in U.S. Pat. No. 3,883,612.

The method of producing the polyester of the types employable in this invention is well known in the art. In general, the reactants are heated together at about 70° C. at which temperature an exothermic reaction occurs. Thereafter, the mixture is heated to 210° C., water being taken overhead, until the acid value of the reaction mixture is about 35. The mixture is then cooled and mixed with inhibitor and monomer to obtain the polyester component of the system.

The amounts of polyester, thermoplastic and monomer, usually styrene, which are employed in the compositions of this invention are generally those employed in the prior art. The polyester can vary from about 31 to about 55 weight percent, the thermoplastic from about 7 weight to about 18 weight percent, and the monomer from about 27 to about 61 weight percent.

The following examples illustrate the invention.

EXAMPLE I

A series of polyesters was prepared employing the following reactants:

TABLE I

| | Reactants, Wgt. In Grams | | | | | | | |
|---|---|---|---|---|---|---|---|---|
| Polyester Designation | Diethylene Glycol | Propylene Glycol | Maleic Anhydride | Adipic Acid | Dipropylene Glycol | Dipropylene Glycol & Adipic Acid | Theoretical Polyester Yield | DPG & AA As Percent Of Yield |
| 1 | 1176 | 272 | 1082 | 488 | 0 | 488 | 2699 | 18.1 |
| 2 | 0 | 375 | 1082 | 352 | 1176 | 1528 | 2700 | 56.6 |
| 3 | 375 | 342 | 1081 | 396 | 803 | 1199 | 2700 | 44.4 |
| 4 | 767 | 309 | 1081 | 444 | 410 | 854 | 2703 | 31.6 |
| 5 | 771 | 287 | 1081 | 454 | 416 | 870 | 2699 | 32.2 |
| 6 | 385 | 320 | 1081 | 387 | 822 | 1209 | 2701 | 44.3 |
| 7 | 835 | 91 | 1142 | 226 | 572 | 798 | 2601 | 30.7 |
| 8 | 905 | 91 | 1142 | 237 | 494 | 731 | 2601 | 28.1 |
| 9 | 942 | 88 | 1142 | 182 | 402 | 584 | 2500 | 23.4 |

TABLE I-continued

| Polyester Designation | Reactants, Wgt. In Grams | | | | | | Theoretical Polyester Yield | DPG & AA As Percent Of Yield |
|---|---|---|---|---|---|---|---|---|
| | Diethylene Glycol | Propylene Glycol | Maleic Anhydride | Adipic Acid | Dipropylene Glycol | Dipropylene Glycol & Adipic Acid | | |
| 10 | 1009 | 88 | 1142 | 193 | 326 | 519 | 2500 | 20.8 |

The polyesters were then individually mixed with the most preferred embodiment of the thermoplastic that is, as previously stated, the thermoplastic was comprised of about 71.4 parts by weight of vinyl-acetate, 27.4 parts of methylmethacrylate monomer and about 1.2 parts of acrylic acid, and with styrene, in a weight ratio of 41:13:46, respectively, and tested for compatibility at two temperatures. Compatibility was considered to be a property of the mixture when the mixture showed no evidence of macroscopic phase separation after standing undisturbed for a period of four weeks.

Results were as follows:

TABLE II

| Resin Number | Ratio * | Compatibility | |
|---|---|---|---|
| | | At 46° F. | At 72° F. |
| 1 | 18.1 | I** | I |
| 10 | 20.8 | I | Not determined |
| 9 | 23.4 | I | Not determined |
| 8 | 28.1 | I | I |
| 7 | 30.7 | C*** | I |
| 4 | 31.6 | C | C |
| 5 | 32.2 | C | C |
| 6 | 44.3 | C | C |
| 3 | 44.4 | C | C |
| 2 | 56.6 | C | C |

*DPG and AA as percent of yield.
** I = Imcompatible
*** O = Compatible

These data indicate that when the total weight of the dipropylene glycol and the adipic acid comprise not less than about 30 percent of the weight of the expected yield of the polyester product, the resins are compatible. These data also indicate that percentages within the range of from about 30.7 to about 56.6, and preferably from about 31.6 to about 56.6, produce polyesters yielding compatable systems.

EXAMPLE II

Certain of the polyester prepared in Example I were mixed with the most preferred embodiment of the thermoplastic and with styrene over a range of weight ratios and compatibility determinations were made at 39°-46° F. and at 73° F. Results were as follows:

TABLE III

| Polyester Number | Weight Ratio: Polyester : Thermoplastic : Styrene | | | | | | | |
|---|---|---|---|---|---|---|---|---|
| | 54:7:39 | 51:8:41 | 47:10:43 | 44:12:44 | 41:13:46 | 37:15:48 | 34:17:49 | 31:18:51 |
| 1 | C | C | C | C | C | C | C | C |
| 4 | C | C | C | C | C | C | C | C |
| 5 | C | C | C | C | C | C | C | C |
| 6 | C | C | C | C | C | C | C | C |

The above data indicate that all compositions were compatible under the aforestated conditions.

EXAMPLE III

Certain of the polyesters prepared in Example I were incorporated into bulk molding compounds (BMC).

These bulk molding compounds all contained 40 to 42 phr polyester, 13 phr thermoplastic and 47 to 45 phr styrene. (phr=parts per hundred parts of resin)

In addition, the bulk molding compounds comprised 150 phr of conventional filler and 30 phr of ½" long glass fibers.

The compounds were then molded in a 12"×12" mold at a pressure of about 68 tons, at a temperature of about 295° F. to about 305° F. and at a cycle time of about 3½ minutes.

Ten surface roughness readings were made on each of three moldings of each compound, a total of 30 determinations being made on moldings from each BMC. Shrinkage of each of the three panels was also determined. Results were as follows:

TABLE IV

| Resin Number | Roughness, Micro-inches | Shrinkage, mils/in. |
|---|---|---|
| 3 | 130 | 1.9 |
| 4 | 130 | 1.6 |
| 5 | 99 | 1.6 |
| 6 | 136 | 2.1 |

The above data indicate that bulk molding compounds produced from the resin system of this invention when molded under heat and pressure produce molded articles having very smooth surfaces and exhibiting very low shrinkage.

It will be evident from the foregoing that various modifications can be made to the method of this invention. Such, however, are considered to be within the scope of the invention.

I claim:

1. A compatible, moldable composition comprising a thermoplastic resin, a thermosetting resin and a monomer,
   a. said thermoplastic resin comprising the terpolymer of vinyl-acetate, methylmethacrylate and acrylic acid;
   b. said thermosetting resin comprising an unsaturated polyester produced by the interreaction of propylene glycol, dipropylene glycol, maleic anhydride and adipic acid, the sum of the weight of said dipropylene glycol and said adipic acid comprising not less than about 31.6 percent by weight of the weight of the theoretical yield of the polyester product; and ,
   c. said thermoplastic resin comprising from about 7 to about 18 weight percent of said composition, said thermosetting resin comprising from about 31 to about 55 weight percent of said composition and said monomer comprising from about 27 to about 61 weight percent of said composition.

2. A compatible, moldable composition comprising a thermoplastic resin, a thermosetting resin and a monomer,
   a. said thermoplastic resin comprising the reaction product of about 71.4 parts by weight of vinyl-acetate, 27.4 parts by weight of methylmethacrylate monomer and about 1.2 parts by weight of acrylic acid;
   b. said thermosetting resin comprising an unsaturated polyester produced by the interreaction of propylene glycol, dipropylene glycol, maleic anhydride and adipic acid, the sum of the weight of said dipropylene glycol and said adipic acid comprising not less than about 31.6 percent by weight of the weight of the theoretical yield of the polyester product; and,
   c. said thermoplastic resin comprising from about 7 to about 18 weight percent of said composition said thermosetting resin comprising from about 31 to about 55 weight percent of said composition and said monomer comprising from about 27 to about 61 weight percent of said composition.

3. A compatible, moldable composition comprising a thermoplastic resin, a thermosetting resin and a monomer,
   a. said thermoplastic resin comprising the terpolymer of vinyl-acetate, methylmethacrylate and acrylic acid;
   b. said thermosetting resin comprising an unsaturated polyester produced by the interreaction of propylene glycol, dipropylene glycol, maleic anhydride, adipic acid and diethylene glycol, the sum of the weight of said dipropylene glycol and said adipic acid comprising not less than about 31.6 percent by weight of the theoretical yield of the polyester product; and,
   c. said thermoplastic resin comprising from about 7 to about 18 weight percent of said composition, said thermosetting resin comprising from about 31 to about 55 weight percent of said composition and said monomer comprising from about 27 to about 61 weight percent of said composition.

4. A compatible, moldable composition comprising a thermoplastic resin, a thermosetting resin and a monomer,
   a. said thermoplastic resin comprising the reaction product of about 71.4 parts by weight of vinyl-acetate, 27.4 parts by weight of methylmethacrylate and about 1.2 parts by weight of acrylic acid;
   b. said thermosetting resin comprising an unsaturated polyester produced by the interreaction of propylene glycol, dipropylene glycol, maleic anhydride, adipic acid and diethylene glycol, the sum of the weight of said dipropylene glycol and said adipic acid comprising not less than about 31.6 percent by weight of the theoretical yield of the polyester product; and,
   c. said thermplastic resin comprising from about 7 to about 18 weight percent of said composition, said thermosetting resin comprising from about 31 to about 55 weight percent of said composition and said monomer comprising from about 27 to about 61 weight percent of said composition.

5. A compatible, moldable composition comprising a thermoplastic resin, a thermosetting resin and styrene,
   a. said thermoplastic resin comprising the reaction product of about 71.4 parts by weight of vinyl-acetate, 27.4 parts by weight of methylmethacrylate and about 1.2 parts by weight of acrylic acid;
   b. said thermosetting resin comprising an unsaturated polyester produced by the interreaction of propylene glycol, maleic anhydride, and adipic acid, the sum of the weight of said dipropylene glycol and said adipic acid comprising from about 31.6 to about 56.6 percent by weight of the theoretical yield of the polyester product; and,
   c. said thermoplastic resin comprising from about 7 to about 18 weight percent of said composition, said thermosetting resin comprising from about 31 to about 55 weight percent of said composition and said styrene comprising from about 27 to about 61 weight percent of said composition.

6. A compatible, moldable composition comprising a thermoplastic resin, a thermosetting resin and styrene,
   a. said thermoplastic resin comprising the reaction product of about 71.4 parts by weight of vinyl-acetate, 27.4 parts by weight of methylmethacrylate and about 1.2 parts by weight of acrylic acid;
   b. said thermosetting resin comprising an unsaturated polyester produced by the interreaction of from about 287 to about 375 parts by weight of propylene glycol, from about 1081 parts by weight of maleic anhydride and from about 352 to about 454 parts by weight of adipic acid, the sum of the weight of said dipropylene glycol and said adipic acid comprising from about 31.6 to about 56.6 percent by weight of the theoretical yield of the polyester product; and,
   c. said thermoplastic resin comprising 13 weight percent of said composition, said thermosetting resin comprising 41 weight percent of said composition and styrene comprising 46 weight percent of said composition.

7. A molded article molded from the composition of claim 1.

8. A molded article molded from the composition of claim 3.

* * * * *

UNITED STATES PATENT AND TRADEMARK OFFICE
CERTIFICATE OF CORRECTION

PATENT NO. : 4,294,941
DATED : October 13, 1981
INVENTOR(S) : GWILYM E. OWEN, JR.

It is certified that error appears in the above—identified patent and that said Letters Patent is hereby corrected as shown below:

Column 3, line 34 should read:

***C = Compatible

Column 3, line 46 should read:

Certain of the polyesters prepared in Example I were

*Signed and Sealed this*

*Twenty-seventh* Day of *April 1982*

[SEAL]

*Attest:*

GERALD J. MOSSINGHOFF

*Attesting Officer*     *Commissioner of Patents and Trademarks*